(12) United States Patent
Forsberg et al.

(10) Patent No.: US 6,915,549 B2
(45) Date of Patent: Jul. 12, 2005

(54) TOOL FOR INSTALLING COMMUNICATION CABLE IN A CLEFT

(75) Inventors: Kevin Forsberg, Orlando, FL (US); Isaac D. M. White, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 73 days.

(21) Appl. No.: 10/199,196

(22) Filed: Jul. 20, 2002

(65) Prior Publication Data

US 2004/0107558 A1 Jun. 10, 2004

(51) Int. Cl.[7] .................................................. B23P 19/02
(52) U.S. Cl. ........................................... 29/278; 29/235
(58) Field of Search ........................... 29/235, 450, 451, 29/270, 278; 404/87, 74

(56) References Cited

U.S. PATENT DOCUMENTS

| | | | |
|---|---|---|---|
| 1,496,239 A | 6/1924 | Lynch | |
| 2,761,199 A | 9/1956 | Allen | |
| 4,417,398 A | 11/1983 | Steck | |
| 4,578,851 A | * 4/1986 | Song | 29/235 |
| 4,750,226 A | 6/1988 | Costill | |
| 4,790,059 A | 12/1988 | Killpack | |
| 4,797,963 A | 1/1989 | Gulino | |
| 4,910,821 A | 3/1990 | Kieferle | |
| 5,058,254 A | 10/1991 | Vlahogeorge | |
| 5,072,471 A | 12/1991 | Isler | |
| 5,155,890 A | 10/1992 | Goedderz | |
| 5,203,852 A | 4/1993 | Downing | |
| 5,265,326 A | 11/1993 | Scribner | |
| 5,345,662 A | 9/1994 | Gosselin et al. | |
| 5,673,468 A | 10/1997 | Pumpe | |
| 5,884,901 A | 3/1999 | Schilling | |
| 5,984,392 A | 11/1999 | Iannacone | |
| 6,055,789 A | 5/2000 | Zimmerman | |
| 6,115,897 A | 9/2000 | Beals | |
| 6,226,824 B1 | 5/2001 | Hopson | |

* cited by examiner

*Primary Examiner*—Robert C. Watson
(74) *Attorney, Agent, or Firm*—Walters & Zimmerman; Geoff Sutcliffe; Todd Mitchem

(57) ABSTRACT

A tool is disclosed for installing communication cable. The tool has a handle, a first arm extending from the handle, and a second arm extending from the handle. The first arm has a wheel rotatably mounted to the first arm, and the wheel includes a circumferential groove. The second arm includes a cable guide for guiding the communication cable to the groove in the wheel. The handle is used to roll the wheel along a cleft, and the communication cable feeds through the cable guide to the groove in the wheel and the wheel stuffs the communication cable into the cleft.

6 Claims, 15 Drawing Sheets

TOOL FOR INSTALLING COMMUNICATION CABLE IN A CLEFT

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to tools and, more particularly, to a hand tool for installing communication cable in a cleft.

2. Description of the Related Art

As the telecommunications infrastructure grows and improves, more and more communication cable is installed. New residential construction requires new communication cables linking the new homes to the telecommunications network. Businesses, and even some homes, are installing fiber optic communication cables. Even Digital Subscriber Line (DSL) customers are having their old copper telephone wires replaced with new and improved communication cables (such as CAT3 and CAT5 cables). More and more residential telephone customers are adding second and third telephone lines to accommodate Internet access, fax machines, multiple telephone lines, and even home businesses. Cable companies, too, are adding more and more communication cable as digital access to multimedia content improves. The telecommunications infrastructure, then, is exponentially growing and requiring more and more installations of communication cable.

Installing communication cable, however, has become more difficult. Customers want an aesthetic installation, but the communication cable installer only has a limited amount of time to complete the installation. Most customers, for example, want the communication cables hidden from view, however, the installer cannot take the time to route the communication cables between walls. The installer, then often compromises and stuffs the communication cable into a cleft. A "cleft" is a crack, slit, crevice, or, in general, a separation between two or more components. A cleft, for example, often exists along the soffit of a roof of a building. An individual stuffs the communication cable into this cleft, and the communication cable is mostly hidden from view. A cleft may also exist along the siding of a building, between a floor and a baseboard, and between framing members. A cleft, suffice it to say, is any space in which communication cable is stuffed.

Stuffing communication cable along a cleft, however, presents its own problems. Stuffing the communication cable into the cleft is sometimes slow and tedious work, and the communication cable is often damaged. Because the communication cable often tightly fits into the cleft, a screwdriver is often used to stuff the communication cable into the cleft. An individual presses the communication cable into the cleft using the flat blade of the screwdriver. The flat blade, however, has a sharp, pointed edge, and this edge often pokes holes in the outer jacket of the communication cable. The flat blade, even worse, can slice the communication cable, and the blade may also scratch the componentry surrounding the cleft.

Even if the screwdriver does not damage the communication cable, the installer must stuff the communication cable at very short intervals. When stuffing communication cable along the soffit, for example, the individual slowly stuffs a few feet of communication cable and climbs down from the ladder. The individual then moves the ladder, climbs the ladder, and stuffs another few feet. This arduous process is often repeated for one hundred (100) or two hundred (200) feet. Even if the installer does not have to scale a ladder, stuffing a few feet of communication cable at a time is still a slow and arduous task to complete in an allotted time.

There is, accordingly, a need for a tool that stuffs communication cable into a cleft, a tool that speeds up the installation of communication cable, and a need for a tool that does not damage the communication cable while stuffing into the cleft.

BRIEF SUMMARY OF THE INVENTION

The aforementioned problems are reduced by a tool designed to stuff communication cable into a cleft. This tool stuffs the communication cable into the cleft without damaging the communication cable, the cleft, or the components forming the cleft. This invention is also able to continuously stuff communication cable along the cleft, making installation quick and easy for the installing individual. The tool is also designed for single-handed operation, thus freeing the other hand. This invention is also configurable for right-to-left cable runs and for left-to-right cable runs. The tool is also configurable for right-handed and for left-handed operation. The tool of this invention is designed to stuff more communication cable at a faster rate, and thus helps the installer complete the installation within an allotted time.

One embodiment of this invention also describes a tool for installing communication cable. The tool has a handle, a first arm extending from the handle, and a second arm extending from the handle. The first arm has a wheel rotatably mounted to the first arm, and the wheel includes a circumferential groove. The second arm includes a cable guide for guiding the communication cable to the groove in the wheel. The handle is used to roll the wheel along a cleft, and the communication cable feeds through the cable guide to the groove in the wheel and the wheel stuffs the communication cable into the cleft.

Another embodiment of this invention describes a tool for installing communication cable. The tool has a wheel rotatably mounted along a longitudinal axis of a handle. The wheel includes a circumferential groove, and the handle includes a cable guide for guiding the communication cable to the groove in the wheel. The handle is used to roll the wheel along a cleft. As the wheel rolls along the cleft, the communication cable feeds through the cable guide to the groove in the wheel, and the wheel stuffs the communication cable into the cleft.

This invention also encompasses a method for installing communication cable in a cleft. The method comprises sliding a tool along the cleft and stuffing the communication cable into the cleft using the tool. The tool comprises a handle, a first arm, and a second arm. The first arm extends from the handle and has a wheel rotatably mounted to the first arm. The wheel includes a circumferential groove. The second arm also extends from the handle and includes a cable guide for guiding the communication cable to the groove in the wheel. The wheel stuffs the communication cable into the cleft as the tool is slid along the cleft.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
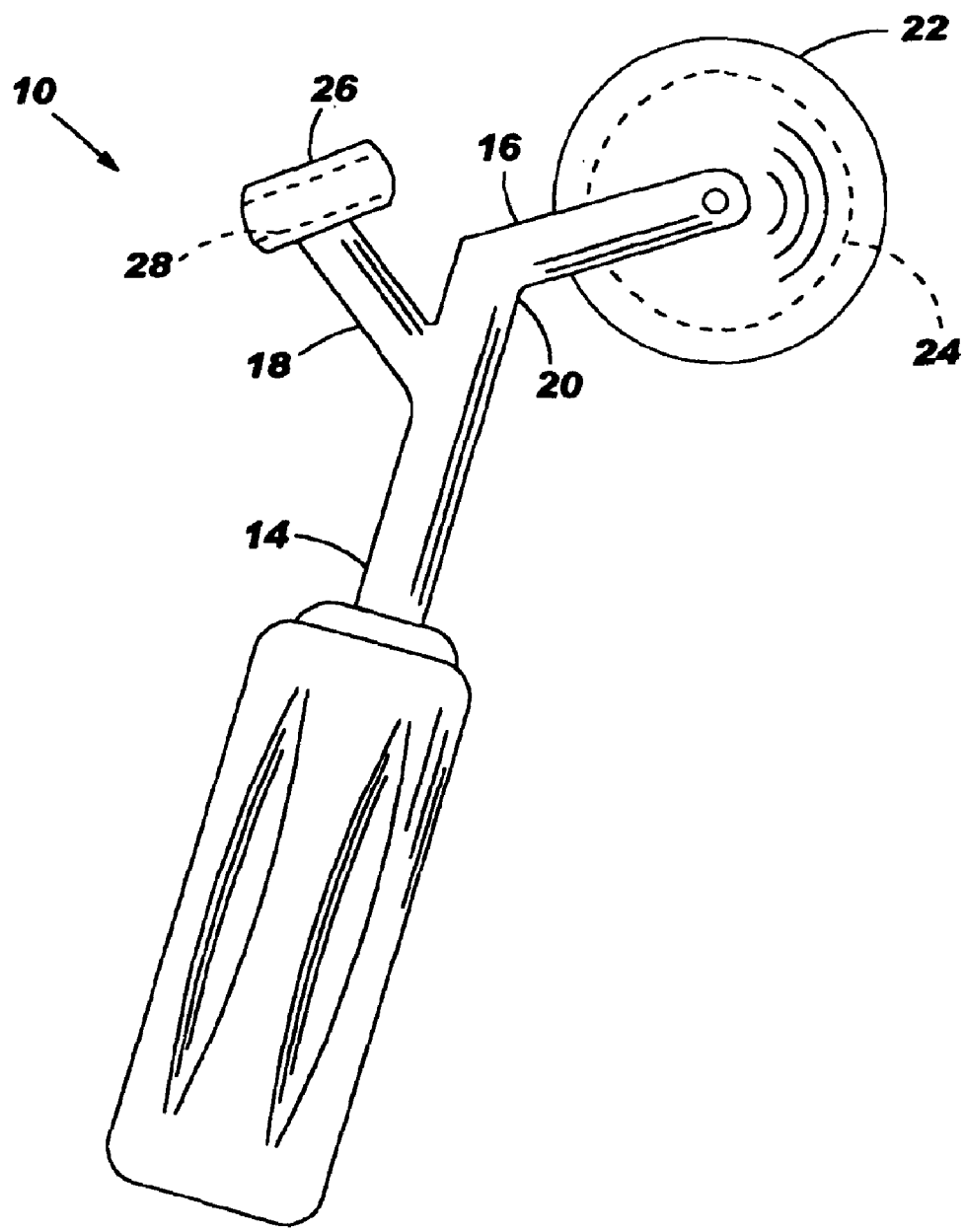
FIGS. 1–3 are schematics showing one embodiment of a tool for installing communication cable.
Figure 2:
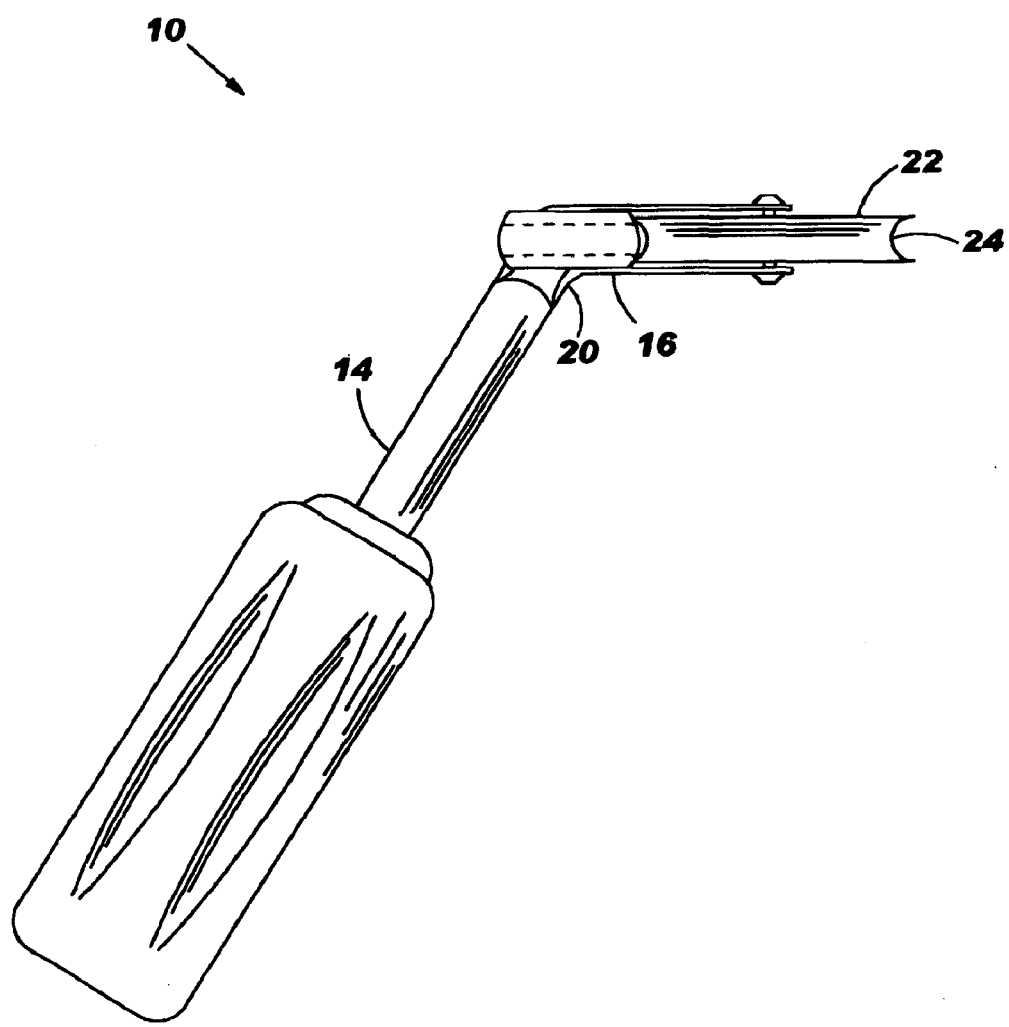
Figure 3:
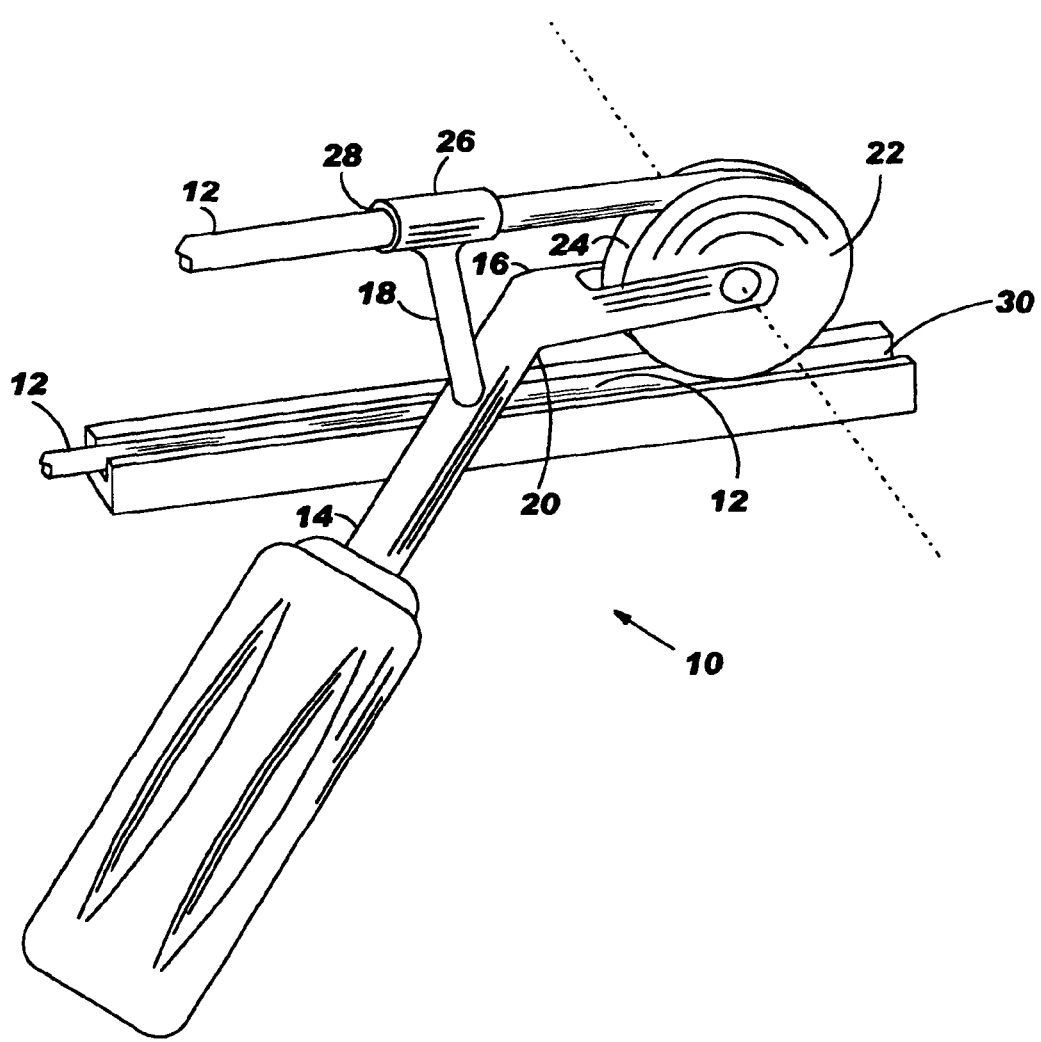

FIGS. 1–3 are schematics showing one embodiment of a tool 10 for installing communication cable. FIG. 1 is a side orthographic view of the tool 10, while FIG. 2 is a top orthographic view of the tool 10. FIG. 3 is an isometric view of the tool 10, and FIG. 3 also shows the tool being used to install communication cable 12. The tool 10 has handle 14, a first arm 16, and a second arm 18. The handle 14 has a distal end 20, and the first arm 14 outwardly extends from the distal end 20. A wheel 22 is rotatably mounted to the first arm 16, and the wheel 22 includes a circumferential groove 24. The second arm 18 also outwardly extends from the handle 14, and the second arm 18 includes a cable guide 26. The cable guide 26 has an eye 28 through which the communication cable 12 passes. The eye 28 is preferably aligned with the groove 24 in the wheel 22, and the cable guide 26 feeds the communication cable 12 to the groove 24 in the wheel 22. As FIG. 3 shows, the handle 14 is used to roll the wheel 22 along a cleft 30. The cleft 30 may be any crack, joint, crevice, gap, lip, slit, space, or the like into which the communication cable 12 is routed. The communication cable 12 feeds through the cable guide 26 to the groove 24 in the wheel 22. As the wheel 22 rolls along the cleft 30, the wheel 22 stuffs the communication cable 12 into the cleft 30.

As FIG. 3 illustrates, the tool 10 is operated with one hand. An individual uses the handle 14 to roll the wheel 22 along the cleft. The communication cable 12 feeds through the cable guide 26, and the wheel 22 stuffs the communication cable 12 into the cleft 30. The single-handed operation of the tool 10 allows an individual to quickly install the communication cable 12 into the cleft 30. The tool 10 also reduces the need for the individual to stuff the communication cable 12 with the individual's fingers.

Figure 4:
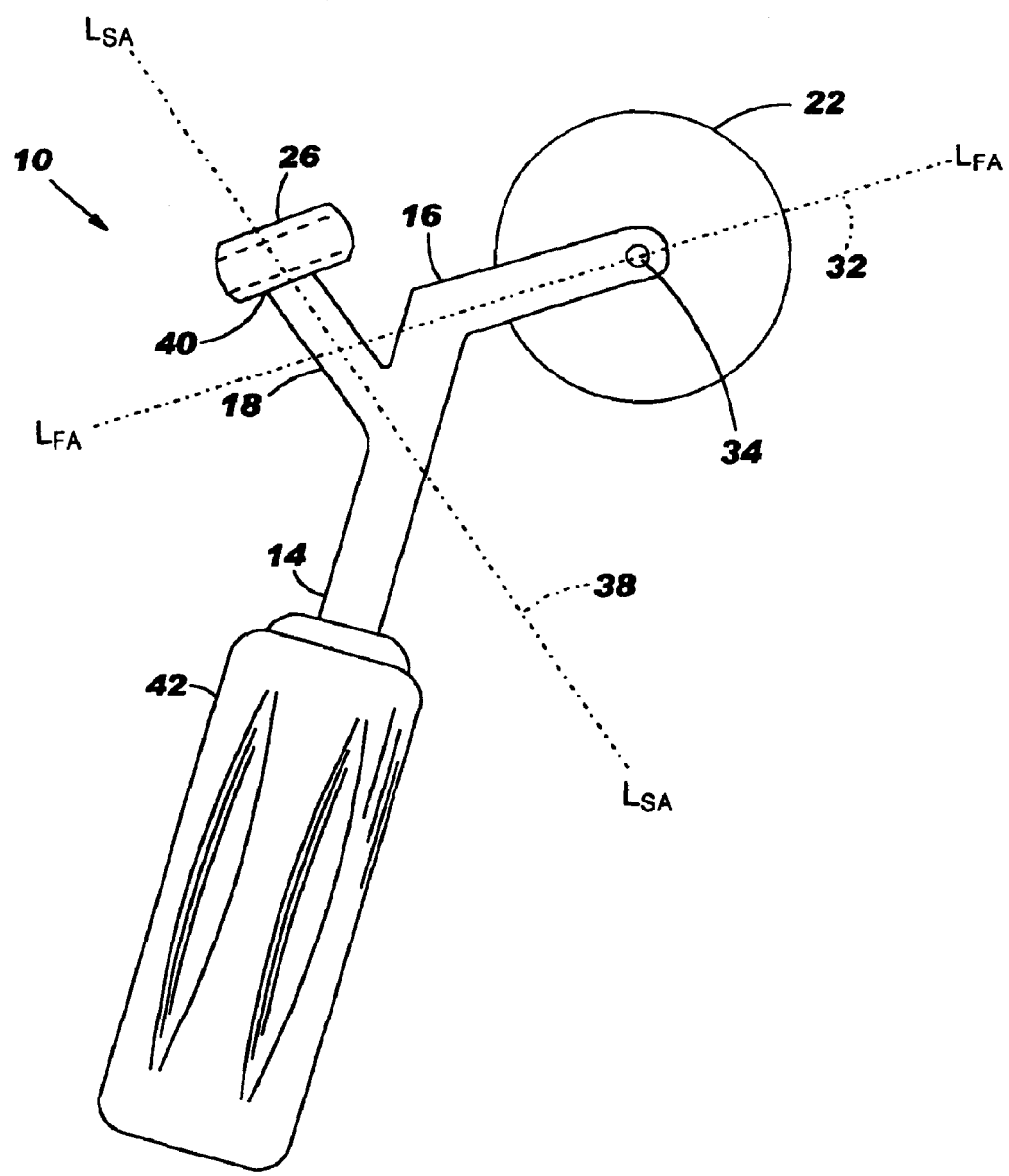
FIGS. 4 and 5 are more detailed top and side orthographic views of the tool shown in FIGS. 1–3.
Figure 5:
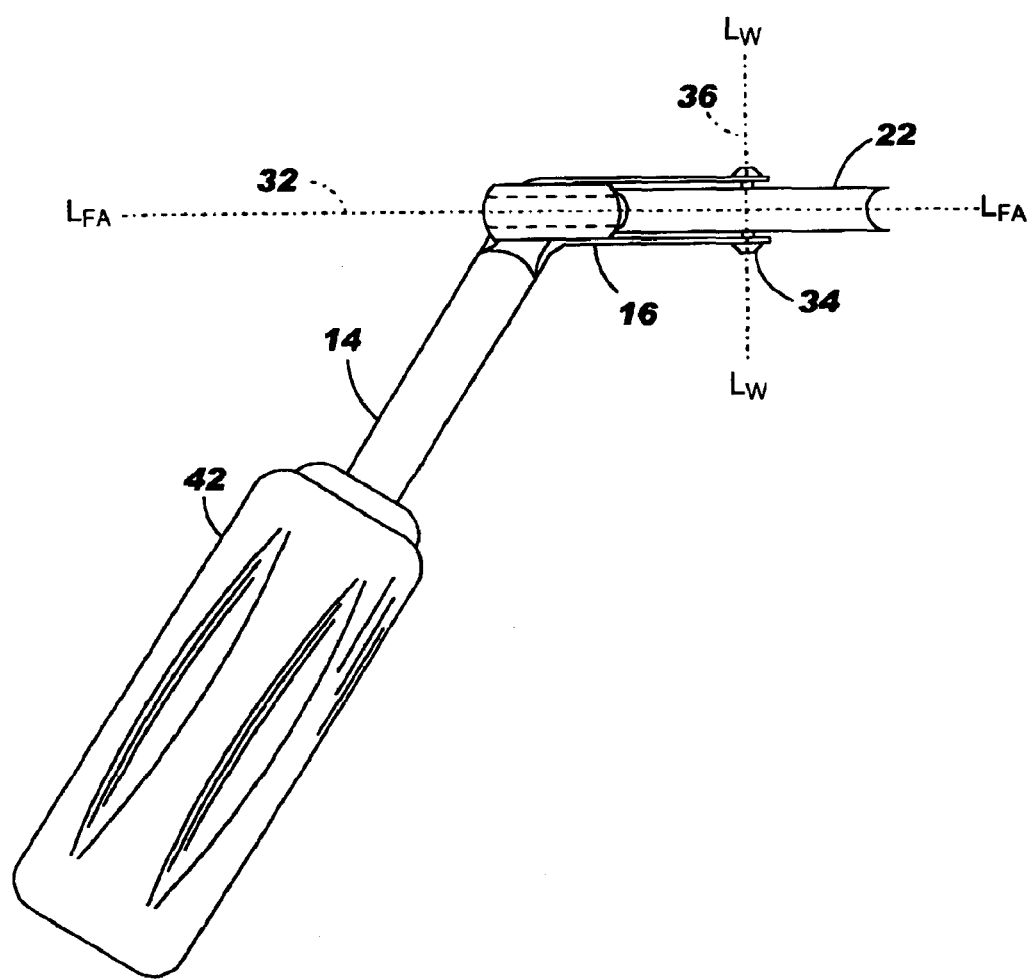

FIGS. 4 and 5 are more detailed top and side orthographic views of the tool 10 shown in FIGS. 1–3. The first arm 16 has a length that defines a longitudinal axis $L_{FA}$—$L_{FA}$ (shown as reference numeral 32). The wheel 22 is rotatably mounted along this longitudinal axis 32. A pin 34, for example, inserts through the first arm 16 and through a center of the wheel 22. The wheel 22 rotates about a rotational axis $L_W$—$L_W$ (shown as reference numeral 36). Because the wheel 22 is rotatably mounted along the longitudinal axis $L_{FA}$—$L_{FA}$ of the first arm 16, the rotational axis $L_W$—$L_W$ of the wheel 22 lies along the longitudinal axis $L_{FA}$—$L_{FA}$. The second arm 18 also has a length that defines a longitudinal axis $L_{SA}$—$L_{SA}$ (shown as reference numeral 38), and the cable guide 26 is disposed at a distal end 40 of the second arm 18. The handle 14 may also include a contoured gripping surface 42 for easier use. The pin 34 may be replaced with a bolt, bearing, screw, or any other means of mounting the wheel to allow rotation.

Figure 6:
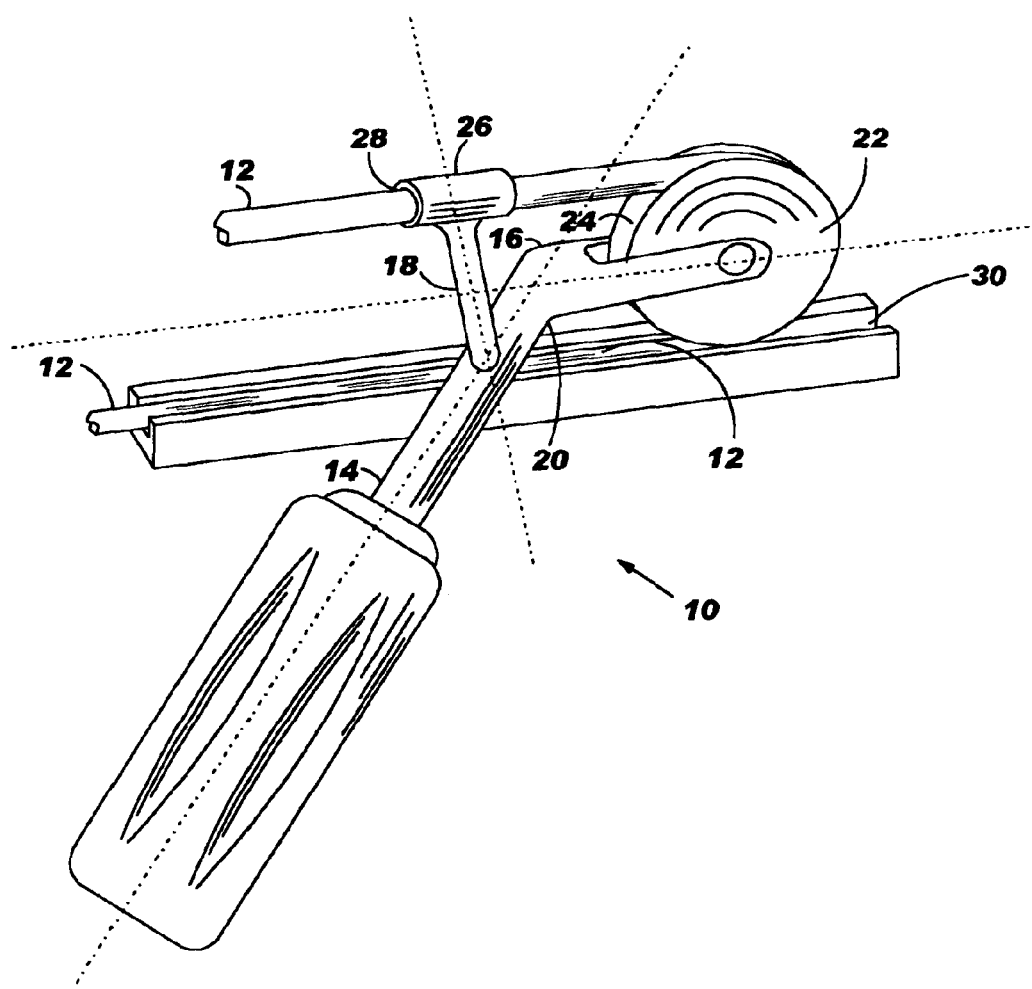
FIG. 6 is another isometric view of the tool shown in FIGS. 1–5.

FIG. 6 is another isometric view of the tool 10. FIG. 6 shows the handle 14, the first arm 16, and the second arm 18 have a generally "Y"-shaped configuration. This generally "Y"-shaped configuration, however, may have various planar orientations. The handle 14, for example, may lie in one plane, while the first arm 16 and the second arm 18 may commonly lie in a second plane. As FIG. 6 shows, the longitudinal axis $L_{FA}$—$L_{FA}$ (shown as reference numeral 32) of the first arm 16, and the longitudinal axis $L_{SA}$—$L_{SA}$ (shown as reference numeral 38) of the second arm 18, lie in a common plane. The handle 14 also has a length that defines a longitudinal axis $L_H$—$L_H$ (shown as reference numeral 44), and this longitudinal axis $L_H$—$L_H$ does not lie in the same plane. Any combination of the handle 14, the first arm 16, and the second arm 18, in fact, yields two members oriented in a common plane and a third member in a different plane. This generally "Y"-shaped configuration may thus be oriented to provide improved access to clefts and to improve ergonomics for single-handed operation.

Figure 7:
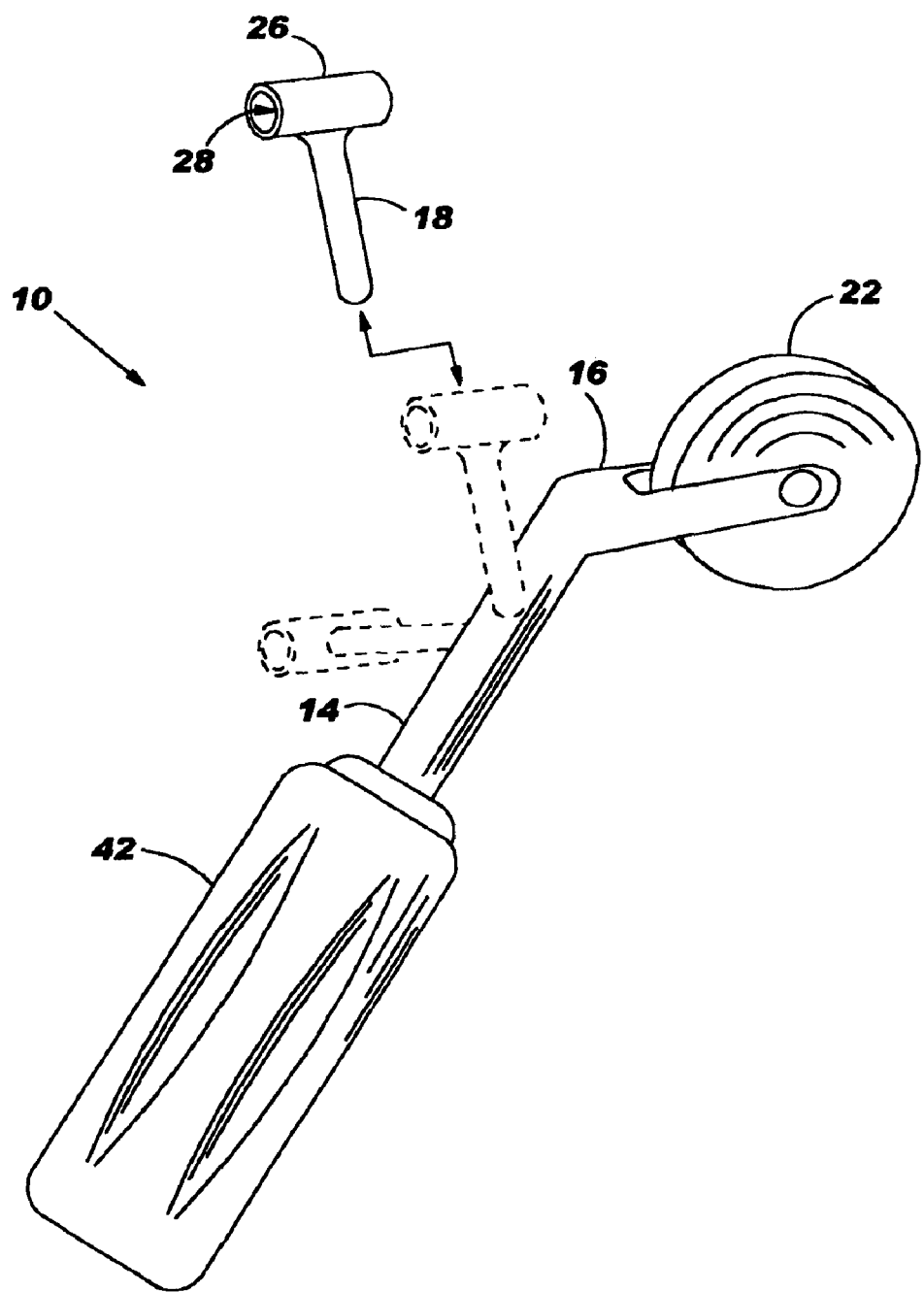
FIG. 7 is an isometric view of an alternative embodiment of this invention.

FIG. 7 is an isometric view of an alternative embodiment of the tool 10. Here the tool 10 may be configured for right-sided or left-sided runs along a cleft. FIG. 7 shows the second arm 18 is detachable from the handle 14. The second arm 18, and thus the cable guide 26, may be oriented to feed cable to either side of the wheel 22. This feature allows the tool 10 to install communication cable using a left-to-right motion or a right-to-left motion. This detachable feature is also advantageous for right-handed or left-handed operation. Threads, detents, snap rings, lock rings, or any other means of releasably securing the second arm 18 to the handle 14 are within the scope of this invention.

Figure 8:
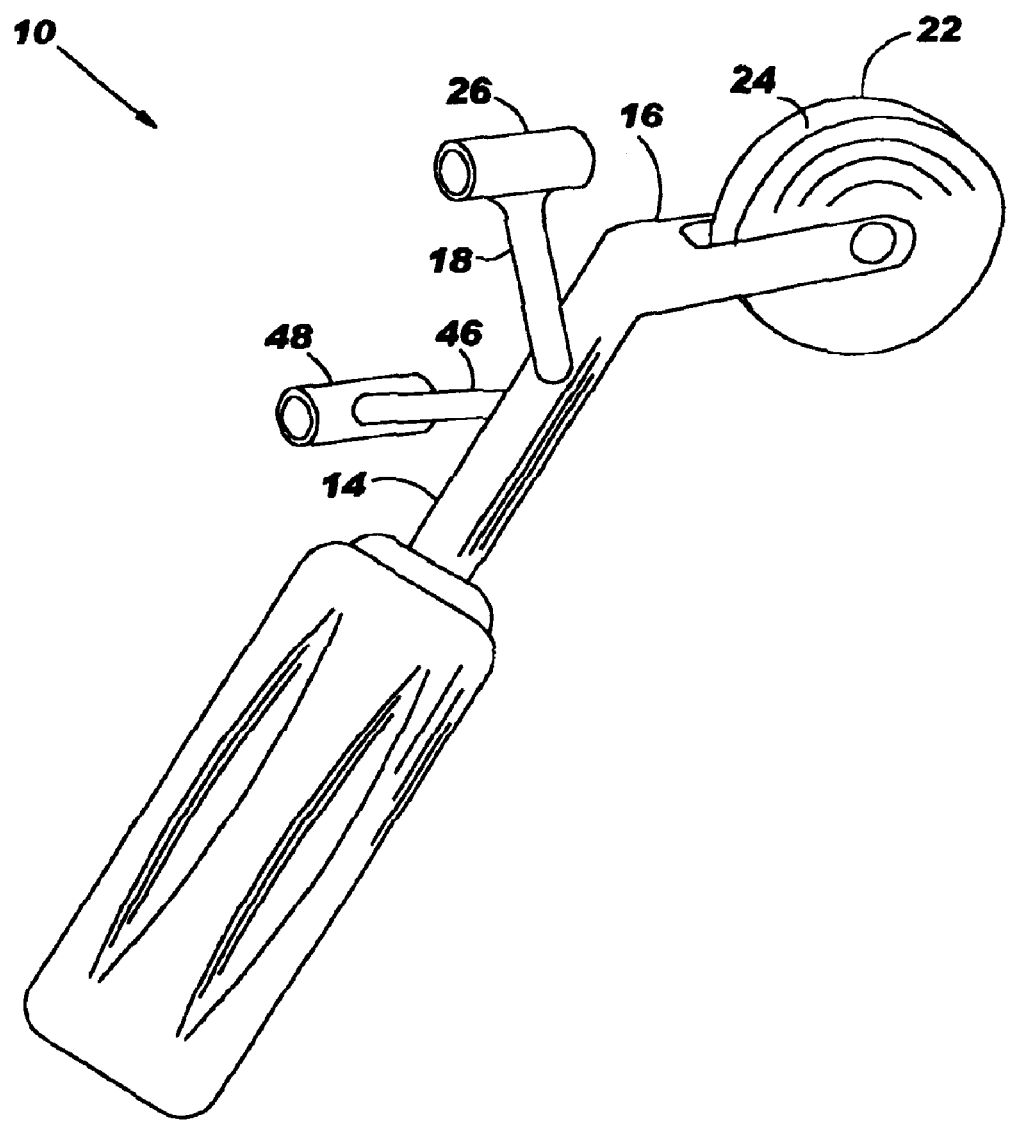
FIG. 8 is an isometric view of still another embodiment of this invention.

FIG. 8 is an isometric view of still another embodiment of this invention. FIG. 8 shows the tool 10 may be configured with a third arm 46. This third arm 46 outwardly extends from the handle 14 and also includes a second cable guide 48. The second cable guide 48 preferably aligns with the groove 24 in the wheel 22. This embodiment allows an individual to make left-to-right cable runs, and right-to-left cable runs, without reconfiguring the tool 10.

Figure 9:
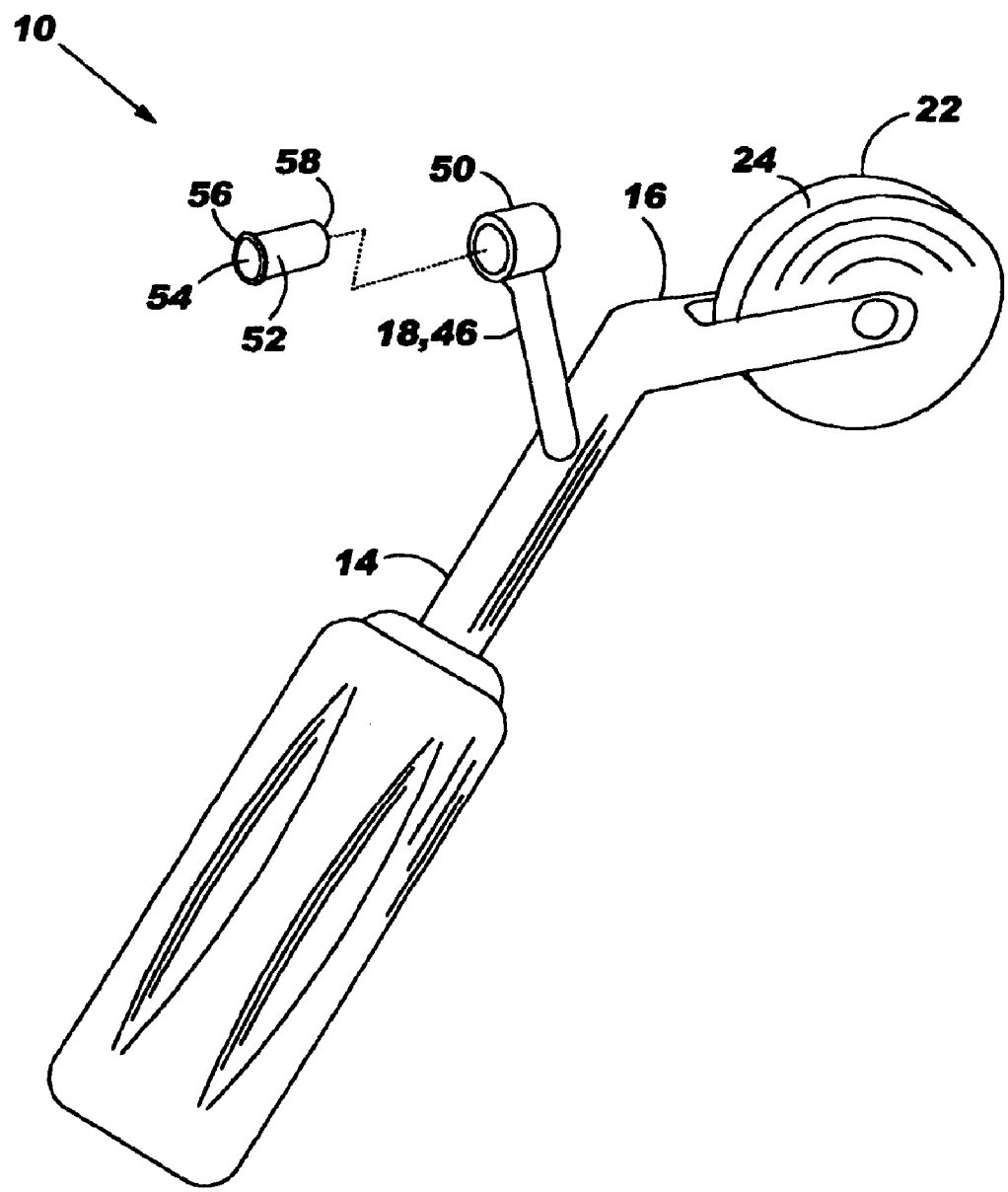
FIGS. 9 and 10 illustrate yet another embodiment of this invention.
Figure 10A:
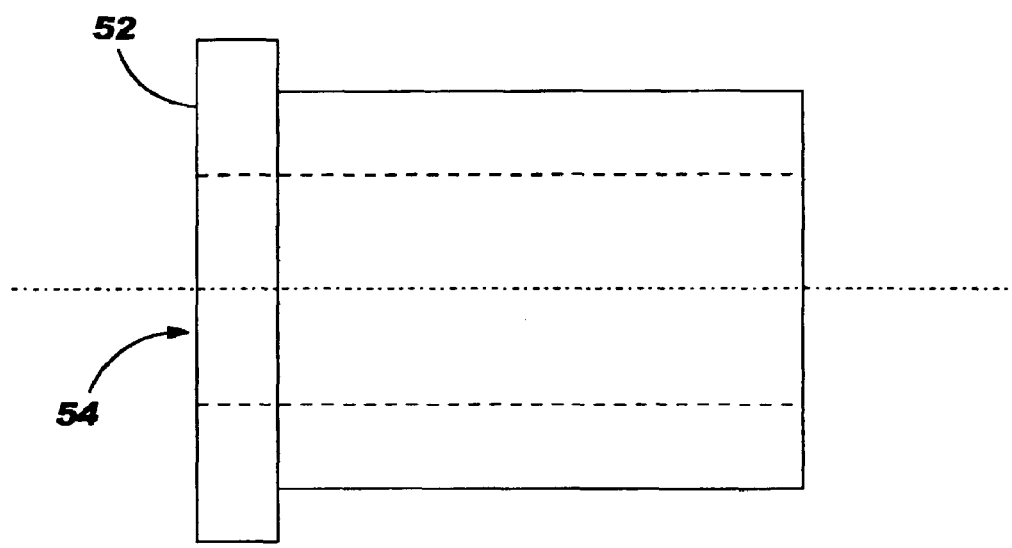
Figure 10B:
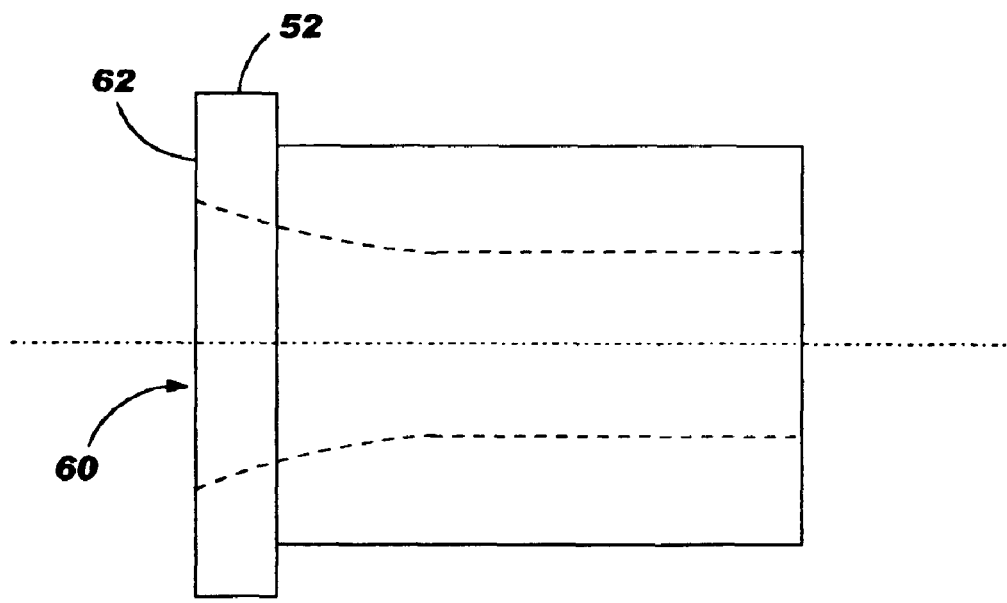

FIGS. 9 and 10 illustrate yet another embodiment of this invention. FIG. 9 is an isometric view of this alternative embodiment, while FIGS. 10A and 10B are side orthographic views of components. Here a ring- or hoop-shaped cable guide 50 accepts an interchangeable insert 52. The insert 52 has a bore 54 extending from one side 56 of the insert 52 to an opposite side 58 of the insert 52. The bore 54 has an inner diameter sized to pass communication cable through the bore 54. The insert 52 is inserted into the ring- or hoop-shaped cable guide 50, and the insert 52 and the bore 54 preferably cooperate to align the communication cable with the groove 24 in the wheel 22. The insert 52 is removable and interchangeable with other inserts having different sized bores to accommodate different diameters of communication cable. As FIG. 10 shows, various configurations of the insert 52 further help an individual install communication cable along a cleft. FIG. 10A shows the bore 54 in the insert 52 having a single nominal diameter. Different inserts, with different nominal diameters, are envisioned according to the diameter of the communication cable feeding through the bore 54 to the groove 24 in the wheel 22. FIG. 10B shows the insert 52 may have a tapered bore 60. The tapered bore 60 reduces friction between the communication cable and an inner wall 62 of the tapered bore 60. The insert 52 may also include a tapered shoulder so that the insert 52 may be easily pressed into the ring- or hoop-shaped cable guide 50.

Figure 11:
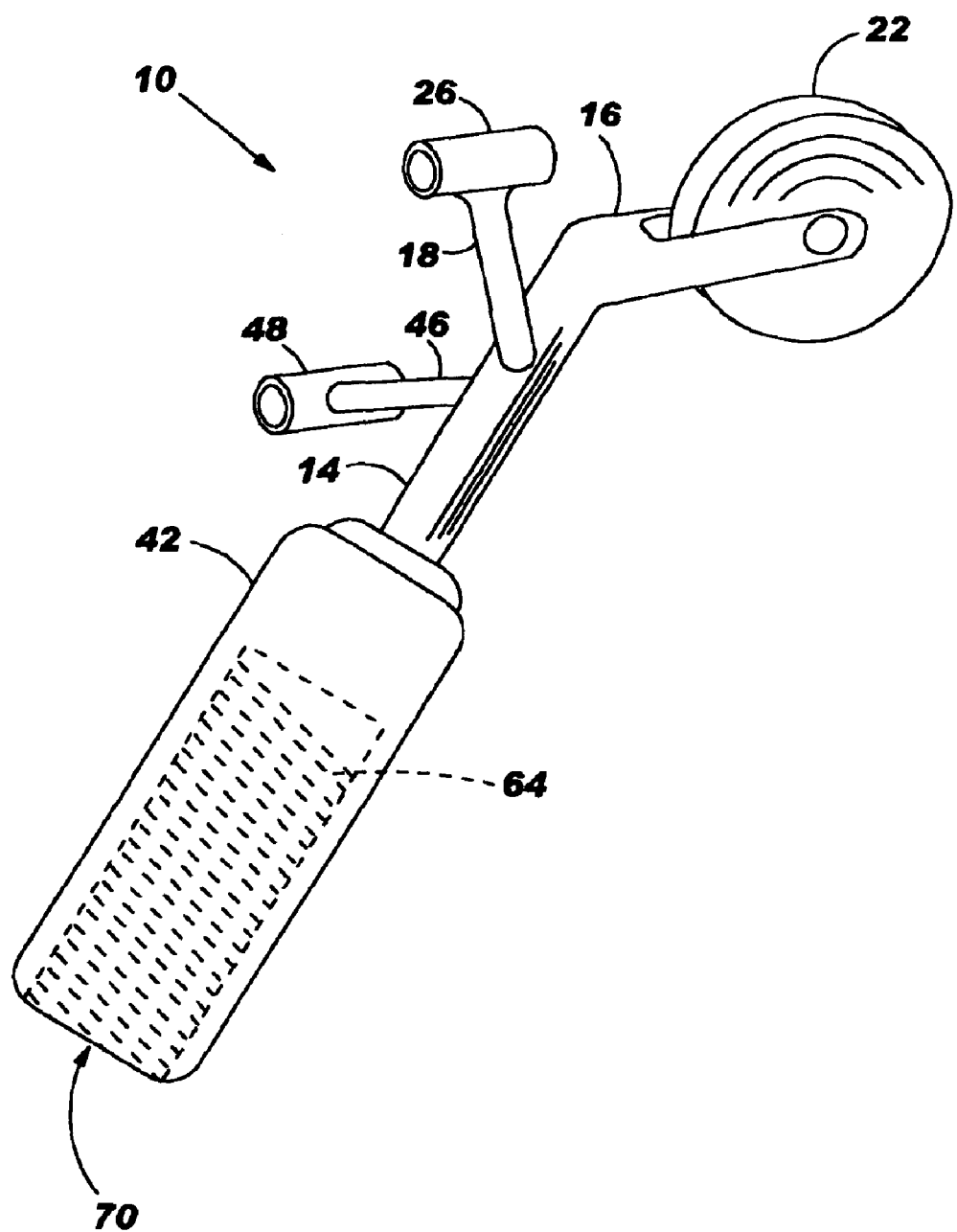
FIGS. 11 and 12 are schematics showing another alternative embodiment of this invention.
Figure 12:
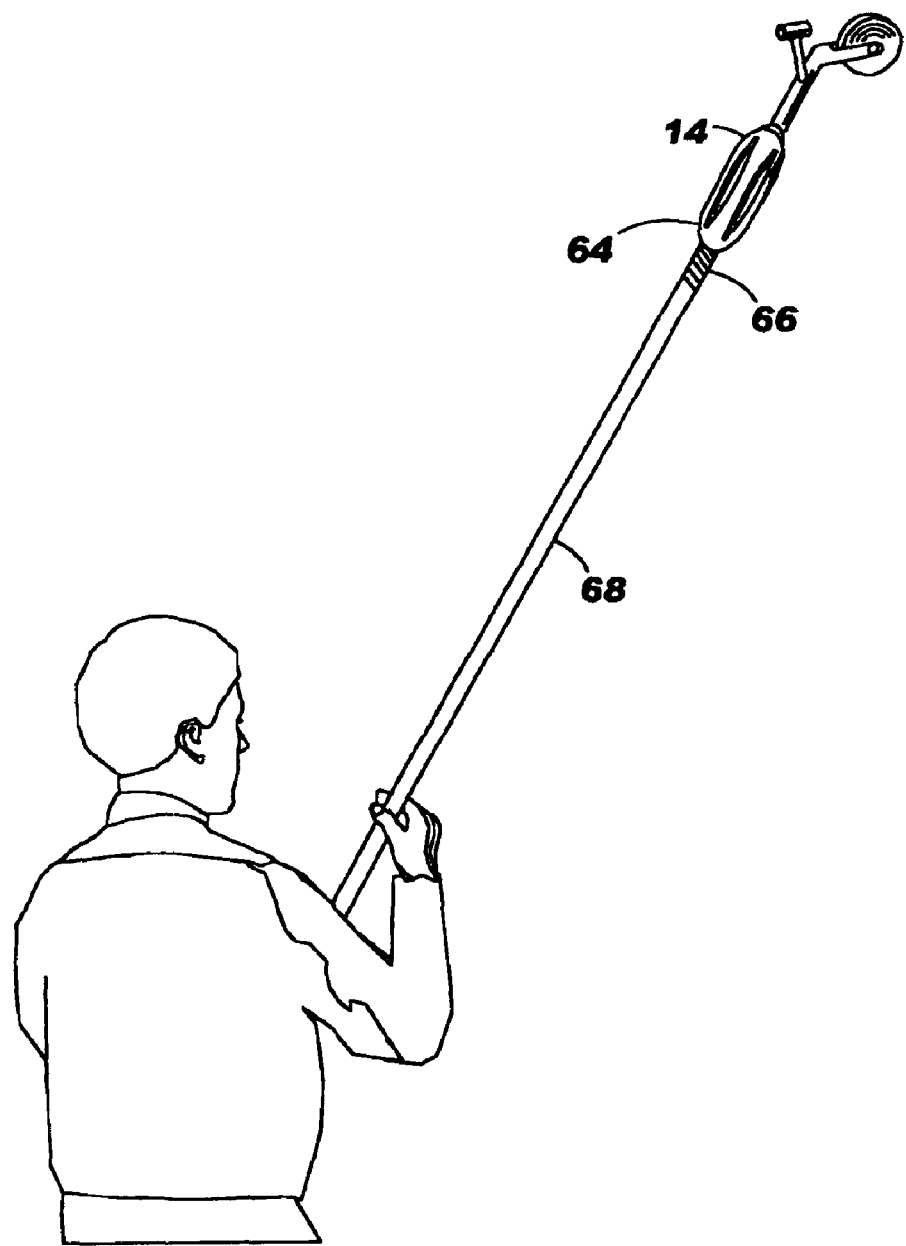

FIGS. 11 and 12 are schematics showing another alternative embodiment of this invention. Here the handle 14 comprises means for accepting an extension handle. The handle 14, for example, may have a threaded portion 64 for accepting a threaded end 66 of the extension handle 68. FIG. 11 shows the handle 14 having a threaded female bore 70, yet the handle could alternatively have a threaded male portion. The means for accepting an extension handle could also comprise detents, locks, tabs, and similar configurations. Because the tool 10 may be used with the extension handle 68, FIG. 12 shows an individual using the tool 10 to stuff communication cable in a hard to reach location.

Figure 13:
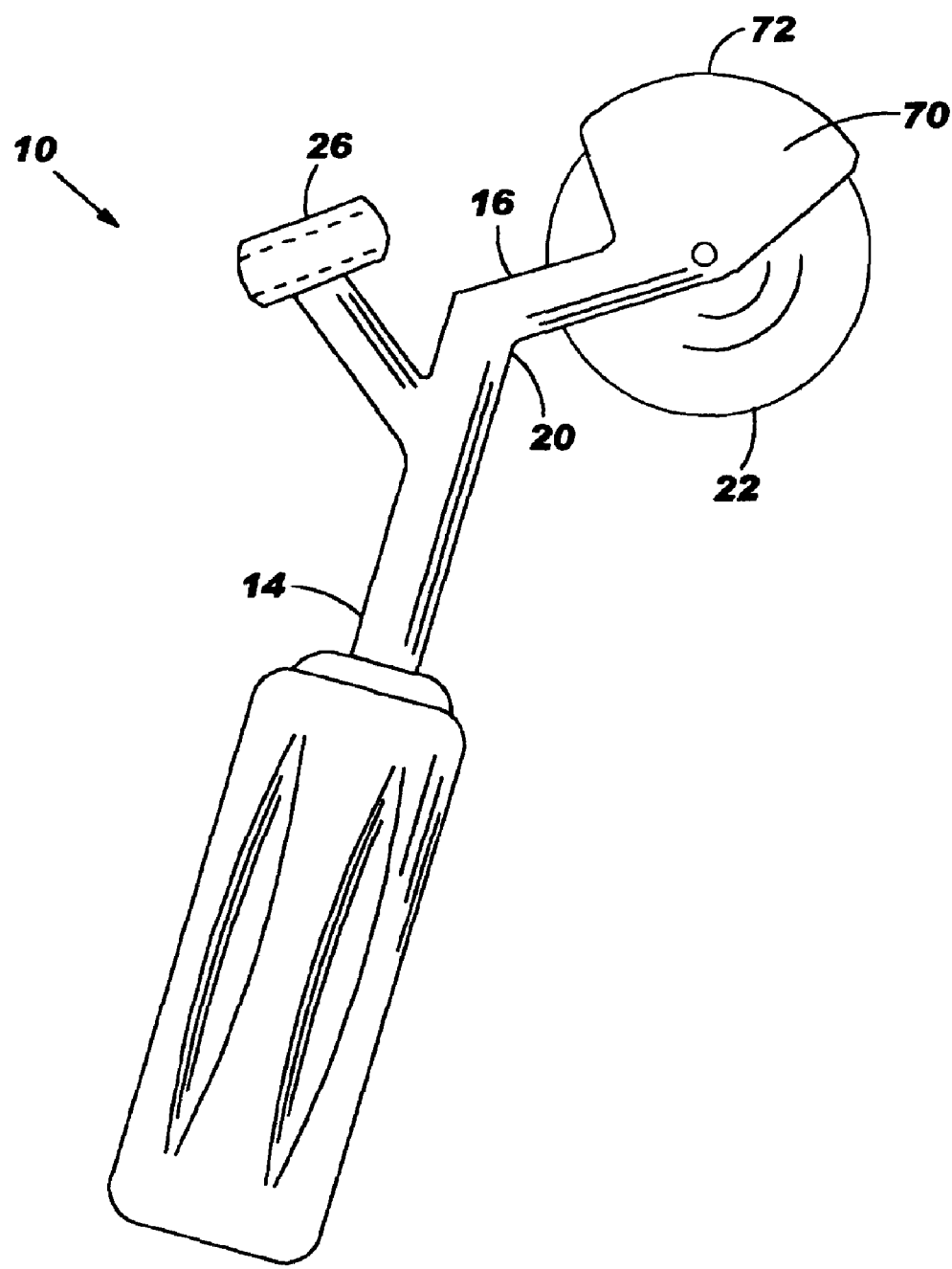
FIG. 13 shows still another alternative embodiment of this invention.

FIG. 13 shows still another alternative embodiment of this invention. FIG. 13 is a top orthographic view showing a shroud 70 surrounding at least a portion of the wheel 22. The shroud 70 helps keep the communication cable from falling out of the groove 24 in the wheel 22. This shroud 70 is especially useful when the tool 10 is used with an extension pole (such as that shown as discussed with reference to FIGS. 11 and 12). If the communication cable falls out of the groove 24, an individual must climb a ladder and rethread the communication cable onto the wheel 22. The shroud 70, however, retains the communication cable and helps keep the communication cable from falling out of the groove 24. The shroud 70 extends beyond an outer circumference of the wheel 22. The shroud 70 has an outer side wall 72, and the outer side wall 72 has a radius greater than the radius of the wheel 22. The shroud allows the individual to run more communication cable in a shorter amount of time.

Figure 14:
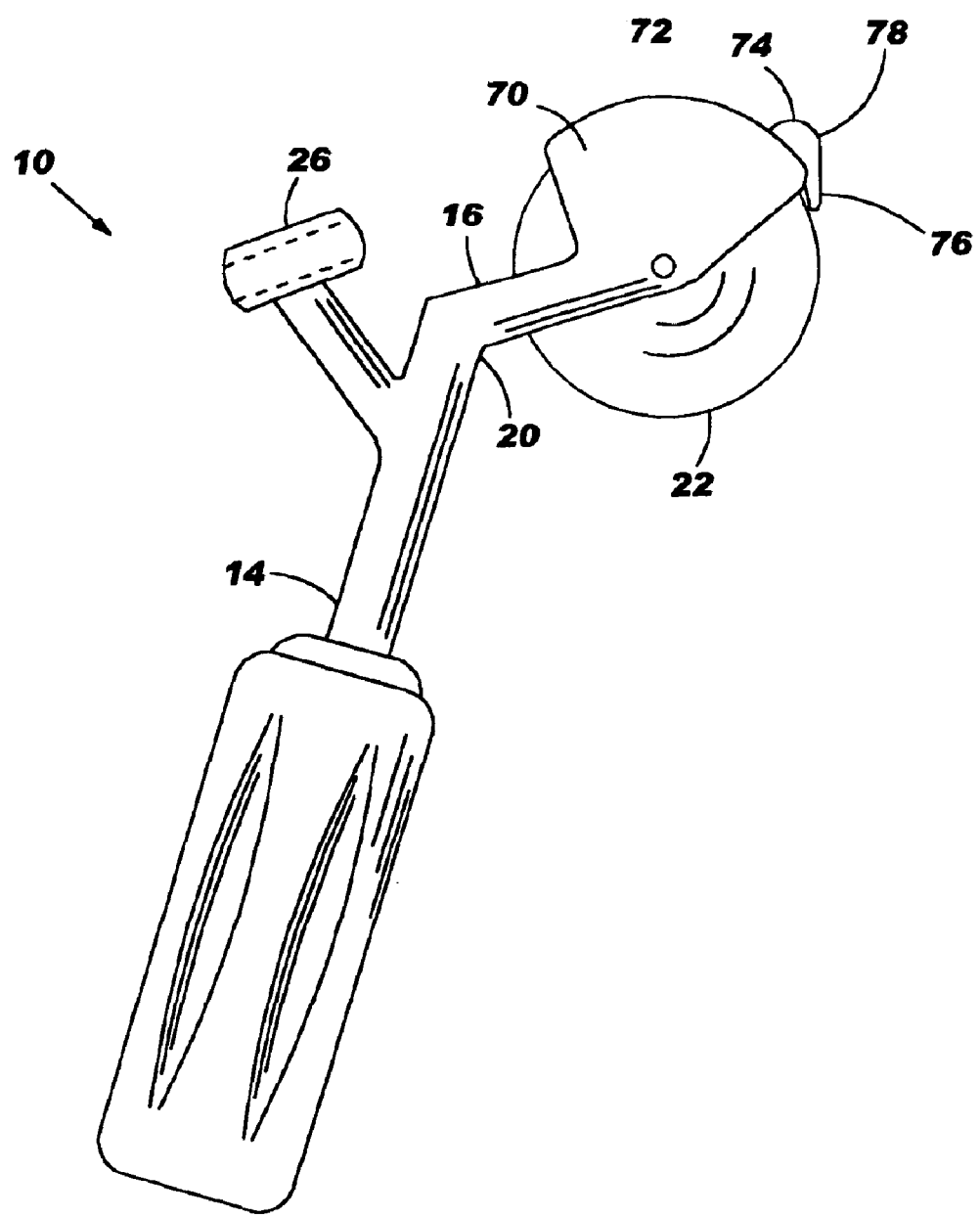
FIG. 14 shows yet another embodiment of this invention.

FIG. 14 shows yet another embodiment of this invention. FIG. 14 is a top orthographic view showing the shroud 70 including a cleft guide 74. The cleft guide 74 inserts into the cleft and helps an individual maintain the wheel 22 rolling along the cleft. As the individual makes a left-to-right cable run, for example, the cleft guide 74 helps keep the wheel 22 tracking along the cleft. The cleft guide extends from the first arm 16 and beyond an outer circumference of the wheel 22. The cleft guide 74 may also include a spreader 76. The spreader 76 spreads or "opens up" the cleft and allows the wheel 22 to more easily stuff the communication cable into the cleft. The spreader 76 is especially useful when the tool 10 is used to install communication cable in vinyl siding, vinyl soffits, and other ductile, plastic material products. When, for example, a soffit cleft is a "tight" fit to the communication cable, the spreader 76 expands the width of the cleft. An individual is then able to stuff the communication cable into the cleft with less force and with less time. While the spreader 76 is especially useful with vinyl siding, vinyl soffits, and other ductile, plastic material products, the spreader 76 also works well with aluminum and wood products.

Care, however, must be exercised to not deform the material. For this reason, the spreader 76 may have various configurations. The spreader 76, for example, would typically have a leading edge 78. The leading edge 78 slides along the cleft and spreads or "opens up" the cleft. The leading edge 78 may have a beveled shape, a wedge shape, a conical shape, a spherical shape, a pointed shape, or any other shape or cross-section that spreads the cleft.

Figure 15:
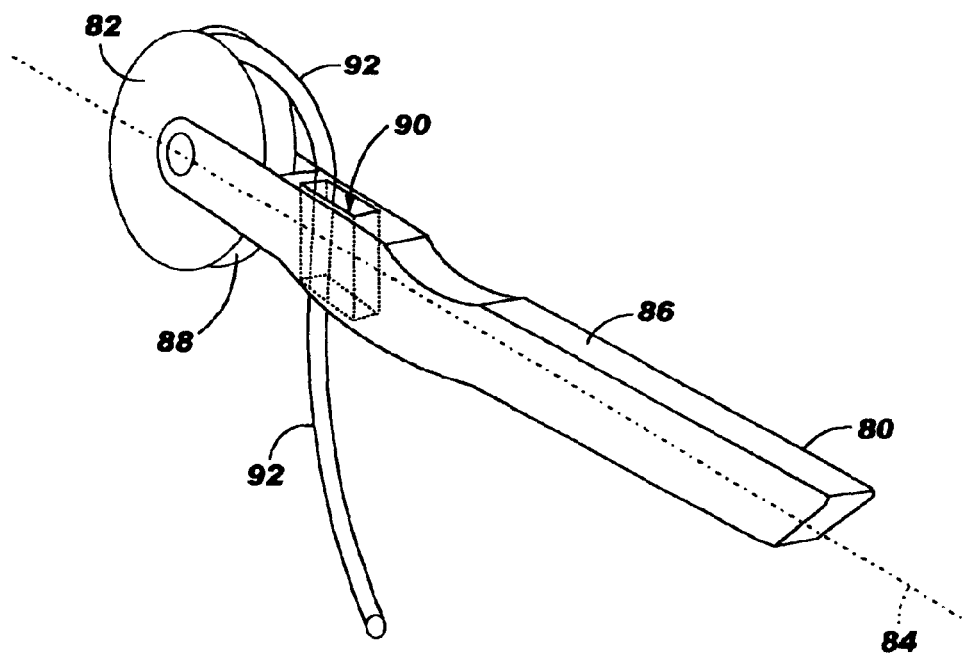
FIG. 15 is an isometric view of another embodiment of this invention.

FIG. 15 is an isometric view of another embodiment of this invention. Here a tool 80 has a wheel 82 rotatably mounted along a longitudinal axis 84 of a handle 86. The wheel 82 includes a circumferential groove 88, and the handle 86 includes a cable guide 90 for guiding a communication cable 82 to the groove 88 in the wheel 82. The handle 86 is used to roll the wheel 82 along a cleft. As the wheel 82 rolls along the cleft, the communication cable feeds through the cable guide 90 to the groove 88 in the wheel 82, and the wheel 82 stuffs the communication cable into the cleft. FIG. 15 shows the cable guide 90 aligned along the longitudinal axis 84 of the handle 86. An alternative embodiment, however, may have an arm extending from the handle 86 (such as the second arm 18 shown in FIG. 1). The cable guide would be disposed along this arm, and the cable guide, as before, feeds the communication cable to the groove 88 in the wheel 82.

This invention also encompasses a method for installing communication cable in a cleft. The method comprises sliding a tool along the cleft and stuffing the communication cable into the cleft using the tool. The tool comprises a handle, a first arm, and a second arm. The first arm extends from the handle and has a wheel rotatably mounted to the first arm. The wheel includes a circumferential groove. The second arm also extends from the handle and includes a cable guide for guiding the communication cable to the groove in the wheel. The wheel stuffs the communication cable into the cleft as the tool is slid along the cleft.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A tool, comprising;

a handle;

a first arm extending from the handle, the first arm having a wheel rotatably mounted to the first arm, the wheel including a circumferential groove, with the handle and the first arm having different planar orientations; and a second arm extending from the handle, the second arm including a cable guide guiding communication cable to the groove in the wheel, wherein the handle is used to roll the wheel alone a cleft, and the communication cable feeds through the cable guide to the groove in the wheel and the wheel stuffs the communication cable into the cleft.

2. A tool according to claim 1, wherein the handle, the first arm, and the second arm form a generally "Y"-shaped configuration.

3. A tool according to claim 1, wherein the first arm and the second arm have a generally planar orientation.

4. A tool according to claim 1, wherein the first arm defines a longitudinal axis, and the wheel is rotatably mounted along this longitudinal axis.

5. A tool according to claim 1, wherein the handle further comprises a contoured gripping surface.

6. A tool according to claim 1, wherein the cable guide comprises an eye aligned with the groove in the wheel.

* * * * *